United States Patent Office 3,663,670
Patented May 16, 1972

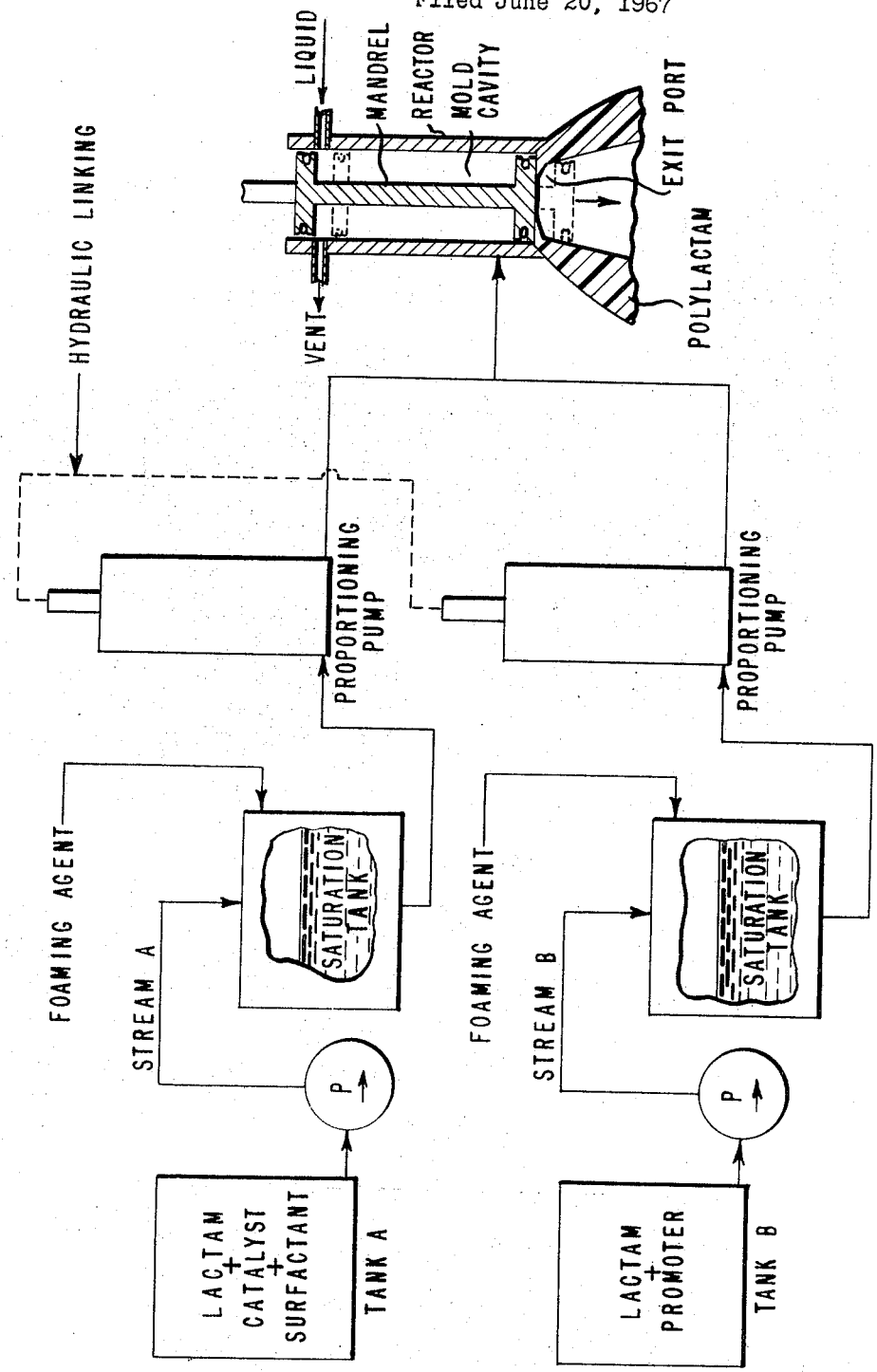

3,663,670
PLUG FLOW METHOD FOR MOLDING FOAMED POLYLACTAMS
Kenneth G. Swayne, Hockessin, Del., and Henry L. Dragun, Glen Burnie, Md., assignors to E. I. du Pont de Nemours and Company, Wilmington, Del.
Filed June 20, 1967, Ser. No. 647,405
Int. Cl. B29d 23/08, 27/04; C08g 20/12, 20/16, 22/44, 53/08
U.S. Cl. 264—53          29 Claims

ABSTRACT OF THE DISCLOSURE

Foamed expanded polylactams are prepared by anionically polymerizing lactam in a mold cavity in the presence of foaming agent under pressure sufficient to maintain foaming agent in the lactam, i.e., monomeric lactam or polylactam. Then, after polymerization is substantially complete, pressure on the polylactam is reduced by opening an exit port and ejecting the shaped solid polylactam out of the mold cavity into an area of lower pressure thus producing cellular polylactam of low density and high tensile strength.

BACKGROUND OF THE INVENTION

There have been many methods known in the industry for making polylactam. These techniques can, in general, be classified into two types of reactions, namely, hydrolytic polymerization and anionic polymerization procedures. There are no known commercially acceptable methods for producing foamed polylactam by hydrolytic polymerization techniques. The art has described in U.S. Pat. 3,017,391 an anionic polymerization process for making foamed polylactams by preparing the polymer containing foaming agent and then heating said polymer above its softening point in order to make a foam. Such procedure does not produce a useful foamed polylactam having a substantially uniform cellular structure and low density. Indeed, up until recently there was no known method for producing commercially acceptable foamed polylactam by anionic polymerization techniques. However, it was recently discovered that foamed polylactam can be prepared by simultaneously polymerizing and foaming lactam below the melting point of the resulting polymer. Such a procedure of simultaneously polymerizing and foaming lactams, as described in British Pat. 918,059, produces high quality foamed articles having a substantially uniform density and an evenly distributed fine cellular structure. However, a need still exisits for foamed expanded polylactams of low density that are characterized as having a high tensile strength and high resistance to abrasion and for a rapid process for making such polylactams in a predetermined shape or, if desired, with a minimum amount of postforming to alter the shape. Such polylactams having substantially all closed cells are highly resistant to compression and those having substantially all open cells are soft, conformable and shock-absorbing.

SUMMARY OF THE INVENTION

It has been discovered that low density, high tesnile strength foamed, expanded polylactams can be prepared by a certain rapid anionic polymerization technique. The process for making such foamed expanded polylactams comprises adding foaming agent under pressure to molten lactam and polymerizing lactam containing lactam-base salt, i.e. an anionic polymerization catalyst, polymerization promoter, i.e. a cocatalyst, and foaming agent in a mold cavity, conducting the polymerization under pressure at least sufficient to maintain foaming agent in the resulting polylactam and after said lactam is substantially polymerized, reducing pressure on the polylactam mass by opening an exit port and ejecting the shaped, solid polylactam containing foaming agent out of the mold cavity into an area of lower pressure where solid-state expansion and foaming occur. Substantially all cellular expansion of the polylactam following the teachings of this invention is effected after polymerization is substantially complete and the solid polylactam is in an area of lower, e.g. atmospheric, pressure. In general, the shape of the expanded foamed polylactam is substantially the same as the shape it had in the mold cavity but with all linear dimensions increased. Therefore, the process of the invention is capable or rapidly and conveniently making foamed, expanded articles of polylactams in a predetermined shape and size with, if desired, a minimum amount of postforming.

The foamed expanded polylactams obtained according to the teachings of the present invention are composed of all closed cells, all open cells or a closed cellular skin integral with open cells that constitute the interior. The foamed expanded polylactam possesses exceptionally high tensile strength and said tensile strength can be expressed by the formula:

$$S_t \geq 20 d^{1.45}$$

wherein $S_t$ represents tensile strength in p.s.i., $d$ represents density and has a value of from 1 to 15 pounds per cubic foot. When the polylactam has a density of 1 pound per cubic foot the tensile strength is greater than about 20 p.s.i., usually not more than 80, and when the polylactam has a density of 15 pounds per cubic foot the tensile strength is greater than about 1000 p.s.i., usually not more than 4000. The polylactam produced by the process of this invention can be composed of cells having cell diameters of about from 5 to 50 microns. Such products, in addition to having high tensile strength and low density, as described above are extremely smooth and the cells are not visible to the naked eye. Such open-cell products are soft and the closed-cell products are hard. In addition, polylactams are made having a dual cell structure wherein cells having diameters of about from 5 to 20 microns and are located within the cell wall boundaries of larger cells that have cell diameters of about from 50 to 2500 microns. The larger cells are open or closed and the smaller cells are closed. In addition to having high tensile strength and low density, a dual cell structure having substantially all closed cells has high compressive strength and resists bending loads. Quite surprisingly, novel polylactams made by the process of this invention can have substantially all open cells and high tensile strength. Foamed polylactams can be made by the process of this invention that have low density in the interior integral with a high density closed cellular surface in addition to high tensile strength. The density at the surface can be at least about one and a half times the average density of the foamed polylactam. Such polylactams are remarkably abrasion resistant at the surface. Articles composed of a skin, or outer surface layer, of closed cells that covers and is integral with open cells that form the interior of the structure can be made by the process of this invention. The novel polylactams having a closed cellular skin that covers and is integral with open cells that constitute the interior of the structure are especially useful as cushioning or interior padding for automobiles and those having all open cells are useful as undermat for carpeting. Polylactams having a dual cell structure of closed cells are particularly useful for pipe-line insulation. Polylactams having higher density at the surface and composed of cells having diameters of from 5 to 50 microns are particularly useful for shoe soles and heels.

DESCRIPTION OF THE PREFERRED EMBODIMENTS

Reference is made to the drawing illustrating a preferred embodiment of the invention wherein ε-caprolactam monomer was prepared in two parts (streams A and B) in closed tanks A and B previously purged with dry nitrogen. Stream A from tank A contained lactam and the anionic catalyst, i.e. the lactam-base salt, and a surfactant which functions, among other things, as a mold release agent. Stream B from tank B contained lactam and promoter, for example, poly-[2,2 - propanebis(4-phenylene)carbonate]. Stream A containing the catalyst was kept at about 125° C. and stream B containing the promoter was heated to about 175° C. Foaming agent, in this instance propane, was incorporated under 700 p.s.i. pressure into both streams by injecting the lactam through a spray nozzle so that it falls through the propane gas in the saturation tank. Under these particular conditions the lactam solution was saturated with gaseous foaming agent. After foaming agent was added to lactam, streams A and B were delivered simultaneously in predetermined amounts by proportioning pumps to a mold cavity in a pressurized reactor having suitable temperature and pressure control means. The mold cavity was heated to about 200° C. and pressurized at 1400 p.s.i. with dry nitrogen. During delivery of the polymerizable mixture at the bottom of the cavity nitrogen was vented from the top of the cavity to maintain the pressure constant during filling. Alternatively, if desired, the nitrogen could have remained in the mold cavity and thereby build up more pressure in the mold. Immediately after the polymerizable mixture was added to and partially filled the mold cavity a liquid, heptane in this instance, was introduced through a valve into the top of the mold cavity at 1400 p.s.i. and the remaining nitrogen vented. The heptane remained on top of the lactam polymerizable mixture filling the upper portion of the mold cavity. The heptane and nitrogen valves were closed thus confining, or sealing, the polymerizable mixture. The presence of liquid heptane prevented expansion of the lactam composition during polymerization and thus maintained a substantially constant volume of material in the mold cavity both before, during and after polymerization. Alternatively the mold can be completely filled with lactam-containing polymerizable mixture to maintain constant volume during polymerization. The 1400 p.s.i. pressure that was applied was sufficient to prevent bubble formation, i.e. prenucleation, during the early stage of polymerization when the mixture was not very viscous and bubbles, if formed, would tend to enlarge and rise to the surface. However, prenucleation, accompanied by a rise in pressure to about 2300 p.s.i., did occur during the latter stage of polymerization, when the material was viscous and could hold the bubbles in place where they were formed. The additional pressure rise to about 2300 p.s.i. was due to the lower solubility of foaming agent in polymer as compared to monomer. Polymerization was substantially complete in about one minute, as indicated by a leveling off of pressure and/or temperature, and solid polycaprolactam was obtained. The anionic polymerization of the lactam mixture in the mold cavity was fast, due primarily to the polymerization promoter and temperature employed during polymerization. After polymerization of the lactam was substantially complete, pressure in the mold cavity was reduced on the polycaprolactam mass held at a temperature below about the melting point of polycaprolactam. Pressure was reduced about three minutes after monomer was delivered to the mold by opening the the mold exit port to provide an opening for the polylactam material thus causing ejection of the polylactam from the mold cavity at about 100 ft./sec. When the pre-shaped, solid material was outside the mold cavity at atmospheric pressure, it expanded instantaneously substantially equally in all directions to a volume about 30 times larger than its original volume in the mold cavity before ejection. The prenucleated cells had diameters of about 50–150 microns. Additional cells were nucleated, as a consequence of the rapid ejection and solid-state expansion, that had cell diameters about from 5 to 10 microns. These cells were located in the cell boundaries, i.e. cell walls and cell was intersections of the larger cells. The closed cell polycaprolactam had an average density of about 2 pounds per cubic foot.

Any lactam or mixture of lactams can be used in the process of this invention. However, it is preferable to employ lactams, or mixtures thereof, having from 3 to 12 carbon atoms in the lactam ring, and most preferably 6 to 12 carbon atoms, caprolactam being the preferred species. Representative lactams that can be employed either alone or mixed with other lactams are, for example, pyrrolidone, valerolactam, caprolactam, enantholactam caprylolactam decanolactam laurolactam and hexadecanolactam. When a mixture of lactams is polymerized a noncrystalline copolylactam can be produced depending on the amount of lactams admixed; whereas polymerization of a single lactam results in a crystalline homopolymer e.g., polycaprolactam.

The lactam-base salts, or anionic catalysts, used in the process of this invention are prepared by the well-known reaction of bases with a lactam. Generally, for convenience, the lactam that is to be polymerized is used for the preparation of such anionic catalysts; but if desired, the anionic catalysts can be prepared from other lactams. The anionic catalyst, then, is a lactam anion, e.g. caprolactam anion formed by the removal of the proton on the nitrogen of the lactam by the reaction of a lactam with a metal base. The base employed to form the anionic catalyst is an alkali metal, an alkaline earth metal, or a basic derivative of one of these metals such as hydroxide, alkoxide, hydride, alkyl, aryl, amide, Grignard reagents or organic acid salts. All of these bases are of the type which are strong enough to convert the lactam to its minimum salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl and sodamide, are representative bases for the preparation of the anionic catalyst. The anionic catalyst is prepared by heating the lactam with a base at a temperature between about 25° and 225° C. The base can be added to the total lactam which is to be polymerized, or alternatively, to a portion of the lactam which is to be polymerized and this portion of the resultant lactam containing the anionic catalyst added to more of the lactam later. The time required for preparing the anionic catalyst varies from a few seconds to several hours and depends upon a number of variables, for example, the strength of the base employed, the proportion added, and the temperature employed. If the solution of lactam-base salt in lactam is to be held for long periods of time before use, the temperature should be kept below about 125° C. Preferably, the lactam and the base should be substantially anhydrous. Generally, the amount of the base charged is between about 0.1 mole percent and about 5.0 mole percent of the total lactam used, and the preferred range is between about 0.7 mole percent and about 1.5 mole percent.

Any polymerization promoter, i.e., cocatalyst, capable of causing polymerization of the lactam above the melting point of the monomer can be used in this invention. The polymerization promoters are usually derived from organic or inorganic acids of particular types. Effective promoters are acyl compounds, i.e., compounds having the structure RC=X wherein X can be sulfur or oxygen and the remaining valence of carbon being satisfied with any organic radical. Representative acyl compounds that can be used as promoters are, for example, acyl halides, anhydrides, imides, organic isocyanates, ketenes, alpha-halogenated ketones, N-acetyl caprolactam and substituted ureas. Specifically desirable are N-substituted imides having the structural formula

wherein A is a radical such as carbonyl, thiocarbonyl, imino, sulfonyl, phosphinyl and thiophosphinyl. B is a radical of the group A or nitroso, R is a radical such as A, hydrocarbyl or heterocyclic radicals and derivatives thereof, wherein said radicals in turn can contain radicals such as carbonyl, thiocarbonyl, sulfonyl, nitroso, phosphinyl, thiophosphinyl, tetramino, acylamido, N-substituted carbamyl, N-substituted carbamido, alkoxy and ether groups, A and B, or A and R, together can form a ring system through a divalent linking group, and any free valence bond of the A and B radicals can be hydrogen or R, excepting A directly linked thereto.

Other promoters that are particularly suitable are aromatic carbonate esters having at least one carbocyclic aromatic group attached to the carbonate, (e.g. the polycarbonate of 4,4'-dihydroxydiphenyl-2,2-propane) described in U.S. Pat. 3,207,713. Still other especially effective promoters are 2,2,4-trimethyl-3-hydroxy-3-pentenoic acid β-lactone, described in U.S. Pat. 3,214,415, and acyl-bis heterocyclic compounds (e.g., sebacoyl-bis pyrazole). Triazine derivatives, for example, symmetrical triazines such as triphenoxy-s-triazine and others disclosed in copending application Ser. No. 155,791, filed Sept. 5, 1961 now abandoned and assigned to the assignee of the present application and diphenyl carbamyl heterocyclic compounds (e.g. diphenyl-carbamylimidazole) disclosed in U.S. Pat. 3,274,132 are especially effective promoters that can be employed in this invention.

Other specific representative polymerization promoters which can be used in the process of this invention are, for example 2,2,4,4-tetramethylcyclobutanedione, 2/1 adduct of ε-caprolactam and 2,4-toluenediisocyanate, 2/1 adduct of ε-caprolactam and hexamethylene diisocyanate, 2/1 adduct of ε-caprolactam and 4,4'-methylenebis(phenyl isocyanate), 3/1 adduct of ε-caprolactam and 1,4-xylene-2,4,6-triisocyanate, N,N'-carbonylbiscaprolactam, N,N'-oxalylbiscaprolactam, N,N'-azelоуlbiscaprolactam, 1-diphenylcarbamylimidiazole, 1-diphenylcarbamylpyrazole, 1-diphenylcarbamyl - 1,2,4-triazole, 1-diphenylcarbamylbenzimidazole, 1-diphenylcarbamylbenzo-1,2,3-triazole, diphenyl carbonate, poly[2,2-propanebis(4-phenylene)carbonate], diethyleneglycolbis (phenyl carbonate) and polymers of the formula —$(CF_2S)_x$— where $x$ is 3000 to 6000. The polymerization promoter, or cocatalyst, is used in proportions varying from about 0.15 mole percent to about 0.6 mole percent of the total lactam used, and preferably is from about 0.2 mole percent to about 0.5 mole percent. When the promoter is a polymeric material mole percent is determined by using the molecular weight of the repeating unit in the promoter molecule.

Any foaming agent that does not adversely affect the polymerization process can be incorporated into lactam monomer under pressure to function as foaming agent. The foaming agent is one that is chemically stable, i.e. one that does not decompose in the system under the conditions of temperature and pressure. Preferably and conveniently a gaseous foaming agent is incorporated in the lactam monomer. The lactam monomer is usually, though not necessarily, saturated with gaseous foaming agent. A pressure at least sufficient to incorporate and keep the foaming agent in said monomer for subsequent foaming and expanding of the polylactam is required. The amount of such pressure will vary because it is dependent on the particular lactam monomer, or monomers to be polymerized, the amount of foaming agent added and the degree of solubility of the particular foaming agent in the lactam. In general, convenient operating pressures for adding foaming agent to monomeric lactam are of the order of about 50 to 4500 pounds per square inch. Hydrocarbon foaming agents are especially preferred and pressures of the order of 50 to 1500 p.s.i. can be conveniently used, preferably 100 to 1000 p.s.i. Inorganic gases are less soluble in the lactam and pressure of the order of 1500 to 4500 p.s.i. can be used, preferably 2300 to 3300 p.s.i. Representative materials that function as foaming agents when added to monomeric lactam are, for example, hydrocarbons having 1 to about 5 carbon atoms such as methane, ethane, propane, butane, isobutane, pentane, isopentane, ethylene, propylene or cyclopropane; inorganic gases such as nitrogen, argon, neon and mixtures of any of th above gases. The hydrocarbons having 1 to about 5 carbon atoms are especially preferred.

There are numerous techniques for incorporating foaming agent into lactam monomer. For example, monomer can be circulated from the bottom of a pressurized vessel back into the top of the vessel and sprayed through foaming agent that occupies the top of the vessel. Foaming agent can be added to monomer just before it enters the mold or while it is in the mold cavity. After foaming agent is dissolved in monomer containing anionic catalyst and polymerization promoter, polymerization of the mixture is conducted under pressure. Polymerization under pressure is carried out in a mold cavity at a temperature above the melting point of the monomer and above or below the melting point of the resulting polylactam. The temperature range at which the polymerization reaction is carried out will vary with the molecular weight of the monomer, or the ratio of monomers if copolymers are to be made. Generally, the polymerization temperature of the mix is within the range of about 80° C. to 250° C., preferably 125° C. to 220° C. and for an ε-caprolactam homopolymer the temperature is maintained during polymerization, most preferably, within the range of about from 140° C. to 210° C. Polymerization in the mold takes place rapidly. Usually substantial polymerization of lactam is complete, as evidenced by, for example, leveling off of pressure and/or temperature of the mass in the mold, within a few seconds to several minutes, e.g. 10 seconds to 10 minutes and most often about from 20 seconds to 3 minutes. The particular rate of reaction is largely dependent upon the catalyst-promoter system used, the temperature maintained during polymerization and on the lactam polymerized.

It is necessary to conduct the lactam polymerization reaction under pressure sufficient to maintain foaming agent in both monomeric lactam and the resulting polylactam. Pressure is maintained during polymerization by any suitable means such as a gas, liquid or solid, or combination thereof, in contact with the reaction mixture. The minimum pressure required to be maintained during polymerization depends largely on the solubility of the particular foaming agent in the resulting polylactam. In general, pressure employed during polymerization is at least that pressure at which foaming agent was incorporated in monomer. Under most conditions, the pressure maintained during polymerization will be at least about 100 pounds per square inch more than the pressure used to incorporate foaming agent in monomer. The maximum amount of pressure is only restricted by apparatus limitations. Since the foaming agent is more soluble in monomer than in polymer it is advisable, particularly when a hydrocarbon is used as the foaming agent, to increase the pressure during polymerization above the pressure at which foaming agent was added to monomeric lactam in order to keep foaming agent incorporated in the polymer as it forms. Polymerization of the lactam even under pressure tends to drive the foaming agent out of solution thus creating small bubbles in the polylactam, which is referred to as prenucleation. However, polymerizing at a pressure higher than, for example with gaseous propane or hydrocarbons having 3 to 5 carbon atoms, about from 2 to 4 times the pressure at which gaseous foaming agent was added to monomer, substantially prevents formation of bubbles during the early stage of polymerization, but not the latter, and a better foam structure results. Prenucleation occurring at the beginning of polymerization, when the polymerizing mix is not very viscous, has a tendency to cause larger bubble formation and the migration of said bubbles toward the surface of the polymerizing mass. However, prenucleation during the latter part of polymerization, e.g. when the mixture is viscous enough to hold bubbles in place, followed by rapid ejection, is beneficial when one wants a foamed expanded polylactam having exceptionally high compressive strength and a dual cell structure wherein cells having diameters of 5 to 20 microns are located within the cell wall boundaries of larger cells having diameters of 50 to 2500 microns. At least about half the cells in the expanded polylactam having the dual cell structure have diameters of 5 to 20 microns. The polylactam so produced has molecular oriented cell walls, low density, a high tensile strength and high abrasion resistance.

The molten lactam added to the mold cavity can be an amount sufficient to fill said cavity and thus have a constant volume during polymerization. In order to obtain more uniform expansion, polymerization of the lactam in the mold cavity is preferably conducted under conditions wherein the volume of polymerizable mixture is maintained substantially constant. When the amount of lactam added to the mold cavity is less than that required to fill said cavity, techniques for maintaining constant volume especially during about the last half of polymerization, e.g. about half the time to peak pressure, can be employed. This can be accomplished, for example, by applying mechanical pressure, such as a gas-tight movable mold piston positioned to maintain a constant volume in the mold cavity. Constant volume can be maintained with a liquid that is substantially immiscible with lactam and having a density different from the monomeric lactam, preferably lighter, and contacting the liquid with, for example, the free surface of the polymerizable mixture that does not completely fill the mold cavity. One convenient way to accomplish the latter is to pressurize the mold with a liquid such as heptane, introduced before polymerization occurs, e.g. immediately after monomer injection, at a pressure at least equal to and preferably in excess of the pressure at which foaming agent was added to monomeric lactam. Other fluids that can be used are those that remain liquid under polymerization conditions and are chemically inert, nonmiscible and differ in density from the lactam, for example, aliphatic hydrocarbons particularly those having six to eight carbon atoms.

The polymerization process can also be conducted under conditions for substantially preventing prenucleation during polymerization in the mold cavity. This is accomplished by polymerizing at a pressure sufficiently high to prevent formation of bubbles during the entire polymerization reaction. Such procedure produces a foamed article having substantially all small cells, i.e. having diameters of the order of about 5 to 50 microns. The polylactam is rapidly ejected, e.g. at the rate of at least about 30 feet per second, out of the mold cavity into an area of lower pressure, usually atmospheric. Prenucleation during polymerization can be substantially prevented by increasing the pressure during polymerization over that at which gaseous foaming agent was added to monomer. For example, when gaseous propane, or hydrocarbon having 1 to 5 carbon atoms, is used as foaming agent and the pressure during polymerization is increased more than about 5 times, and generally for practical considerations not more than about 15 times, a polylactam having substantially, e.g. over 90%, all small cells having cell diameters of from 5 to 50 microns is produced. For most purposes, using hydrocarbons having 1 to 5 carbon atoms, the pressure used to incorporate foaming agent into monomer is generally from 100 to 1000 p.s.i. and the pressure during polymerization is about 1000 to 3000 p.s.i. which results in a polylactam composed of very small cells that have cell diameters of about 5 to 50 microns.

After polymerization is substantially complete, as indicated for example by a leveling off of pressure or temperature of the polymerized mass, pressure on the polylactam is reduced resulting in ejection, expansion and foaming of said polylactam in the solid state. The temperature of the polylactam in the mold cavity when pressure on the polylactam is released is always below about the melting point of the polymer so that a solid shaped polymer is subsequently ejected, expanded and foamed. The type of expansion that follows to create the novel foamed polylactam is solid-state expansion, as contrasted to procedures wherein the polymer at the start of expansion, or at the start of extrusion, is a melt or a solution of polymer in liquid. The temperature of polycaprolactam at ejection from the mold cavity for subsequent foaming and expansion is, for example, preferably about from 160° to 225° C.; and for noncrystalline copolymers, which soften at lower temperatures, the range is transposed downward by about, for example 40° C. In any event, the polylactam must be in the solid state at ejection from the mold cavity for subsequent expansion and foaming. Nucleation and expansion of individual cells of the polylactam mass results in a fine-celled, uniform product because the pressure drop causes cell nucleation to occur substantially simultaneously throughout the polymer and soild state expansion causes cellular orientation. The foamed expanded polylactams are composed of cells having molecularly oriented cell walls wherein the thin cell walls are thicker at the cell wall intersections. Due to molecular orientation the foamed polylactams have high tensile strength and high abrasion resistance. Furthermore, these polymers in addition to having high tensile strength can, at the same time, be of very low density, the relationship between tensile strength and density is shown by the above formula.

Expansion of the polylactam occurs when pressure is reduced on the polylactam by opening an exit port for ejection of the solid polylactam out of the mold cavity through the exit port and into an environment of lower pressure, most preferably and conveniently atmospheric pressure, to allow foaming and expansion therein. As soon as an exit is provided for said polylactam, ejection of the solid polylactam out of the mold cavity occurs spontaneously. Ejection of the solid polylactam is due to the internal presure applied and often generated in the polylactam during polymerization in the mold cavity. Free expansion and foaming occur when the solid polylactam passes into a low pressure area, e.g. atmospheric.

Although releasing the pressure on the polylactam by opening the mold cavity allows the internal gas pressure in said cavity to rapidly eject the shaped polylactam, additional pressure can be applied to assist in ejection of the entire shaped polylactam article. It is preferable especially for long objects, for example, about 10 times long as wide, to apply pressure on the polylactam in the mold cavity in order to assist in rapid ejection of the entire shaped polylactam article. The amount of pressure required will, of course, vary greatly depending to a large extent on the length of the object. There is no upper limit on the amount of pressure that can be applied except that dictated by practicality. Generally, regardless of the length of the object a pressure less than the pressure applied during polymerization is satisfactory, for example, 50 to 3000 p.s.i.

The ejection of the polylactam from the mold cavity is rapid. The rapidity with which the shaped polylactam is ejected from the mold cavity depends on the amount of internal pressure in the cavity and any additional pressure applied on the polylactam to force it out of the cavity.

Rapid ejection of the polylactam from the mold cavity is usually assured under the pressure conditions described herein. Such rapid ejection is of the order of at least about 30 feet per second and can be as high as about 300 feet per second. Quite surprisingly, notwithstanding the rather severe distortion of the solid polylactam that sometimes occurs as it is ejected from the mold cavity through the exit port, the shape of the resulting solid-state foamed, expanded, polylactam is substantially the same as that shape that existed in the mold cavity.

When the exit port is opened thereby providing an opening for the polylactam which is ejected by internal pressure in the mold cavity into a lower pressure area, e.g. atmospheric pressure, the polylactam foams and expands. Generally, the minimum opening, dimensionally, for the exit port through which the polylactam passes is about ⅓ of the cross-sectional area of the monomeric lactam polymerizable mixture. The exit port opening cross section generally does not exceed the cross section of the lactam polymerizable mixture. The cross section of the exit port opening usually, but not necessarily, resembles that of the mold geometrically.

It is significant to note that in solid-state expansion the boundaries or surfaces of the polylactam in the mold cavity are also the boundaries or surface of the ejected expanded and foamed polylactam. This type ejection from the mold can be termed "plug flow." Hence, "plug flow" is substantially different from an extrusion process wherein the polymer is molten and becomes mixed on extrusion, and the material that constituted the surface in the mold is not the same material constituting the surface of the shaped article. In the present invention the shape of the mold cavity, and not the shape of the mold exit port, determines the shape of the foamed expanded polylactam. Furthermore, not only does the material remain the same at the interior and surfaces, but the foamed polylactam replicates, in detail, but greatly expanded, the surface detail of the mold. That is to say, if the walls of the mold cavity of the reactor vessel have, for example, a textured surface of honeycomb design, this design is reproduced in expanded form on the foamed polylactam. If the mold cavity wall is columnar and has a small flange or band about the periphery of the column, the foamed expanded polylactam replicates this design, but greatly expanded. Linear expansion of polylactams made according to the present process is at least about 1.5-fold and up to about 4-fold, usually in every direction, thus giving a product which is at least about 4 times the volume of the mold cavity and as much as about 64 times.

The foamed polylactam obtained by the present process can be composed of a skin of closed cells that cover and are integral with open cells that constitute the interior of the structure. This is accomplished by regulating one or more of the following: (a) the particular time at which ejection of the polylactam from the mold cavity occurs after polymerization, (b) the temperature of the polylactam at ejection from the mold cavity, and (c) pressure reduction on the polylactam after substantial polymerization in the mold cavity.

If the polylactam is ejected immediately after substantial polymerization occurs an open-celled product is obtained having a closed cellular skin. By immediately is meant, for example, when the elapsed time after substantial polymerization and before ejection is no more than about half the time required for substantial polymerization. On the other hand, if polylactam is held in the mold cavity, for example about two to four times the time required for substantial polymerization, then ejected, the foamed expanded product contains primarily all closed cells. Generally, this is sufficient time for crystallization to occur at the surface of the polylactam in the mold cavity which consequently restricts subsequent foaming at the surface. This results in a polylactam wherein the density at the surface is at least about one and a half times the average density of the foamed polylactam.

Polylactams that are composed of segregated open and closed cells can also be prepared by controlling temperature. For example, if the temperature of the polymerizable mix entering the mold cavity is the same as the temperature of the mold cavity walls, a temperature gradient will be established from each surface to the center of the object being molded. This is due to the exothermic nature of the reaction and the low thermal conductivity of polylactam. The exit port of the mold is opened and the internal pressure in the mold cavity ejects the polylactam out of the cavity into an area of atmospheric pressure wherein solid-state expansion and foaming occurs. The central portion of the polylactam is at a higher temperature and, therefore, the cells in the interior will rupture when solid-state expansion takes place. Accordingly, the foamed expanred polylactam will contain closed cells at the surface of the article, which was cooler, and open cells at the center or interior of the object, which was hotter. Such polylactams can be described as a structure having a skin of closed cells that cover and are integral with open cells that constitute the interior of the structure. These products have oriented cell walls, possess high tensile strength and have a density at the surface which is at least about one and a half times the average density of the foamed polylactam. Furthermore, the skin forms a tough abrasion-resistant surface and the interior is composed of soft open cells. Usually, the closed cellular skin is less than about a half inch and preferably less than about a quarter inch thick.

Another means for obtaining an open-celled polylactam article having a tough closed integral cellular skin forming the surface layer is to reduce the pressure in the mold cavity partially filled with polylactam after substantial polymerization. This is accomplished by bleeding off a portion of the pressure on the polylactam in the mold cavity. The polylactam is subsequently ejected from the mold cavity by opening said exit port. In general, the amount of pressure remaining after bleed-off, but before ejection, is no greater than about the pressure at which foaming agent was added to monomer and at least about half that pressure. Such articles are especially useful as seat cushions and protective interior padding for automobiles and be either coated or painted, if desired.

The polylactams of this invention can be shaped into a predetermined form after ejection from the mold and expansion has occurred. For example, the expanded polylactam can be passed between rolls or other shaping devices that quickly form the object into a predetermined shape. Pressure can be applied to the edges of the polylactam to crimp and thus increase tear resistance along the crimped edges. Crystalline homopolymers, e.g. polycaprolactam, are preferably postformed before substantial crystallization of the polymer occurs, which is usually within a few minutes after the product is ejected from the mold.

The expanded and foamed polylactams produced by the process of this invention can be made in ready-to-use shapes with, if desired, a minimum amount of postforming. The polylactams made by the present invention have a high tensile strength due in large part to molecular orientation of the cell walls that result when expansion occurs in the solid state. The tensile strength of the polylactam in pounds per square inch is at least equal to 20 times the density of the polylactam to the power 1.45.

The following examples are illustrative of the invention.

EXAMPLES 1–10

Caprolactam monomer (40 grams) was melted and the molten monomer was mixed with 6% by weight potassium stearate and 3 mole percent sodium hydride to form the lactam-base salt. The resulting catalyzed molten monomer was delivered in a thin stream against an internal surface of a heated vessel containing pressurized gaseous foaming agent thereby incorporating gaseous foaming agent in the monomer under pressure. The temperature of the catalyzed stream was between about 150–160° C. A separate portion of an equal amount of caprolactam was heated and the molten monomer mixed with 0.4 mole percent of the promoter poly[2,2-propane-bis(4-phenylene)carbonate] and similarly injected into a second heated vessel containing pressurized gaseous foaming agent thereby incorporating gaseous foaming agent in the monomer under pressure. The temperature of the promoted stream was between about 190–200° C.

The resulting catalyzed and promoted molten monomer streams containing foaming agent were then delivered at equal rates into a mixing zone immediately external to the mold and the polymerizable mixture was fed to the prepressurized mold cavity through a feed port at the bottom of the cavity. The cavity was prepressurized with foaming agent gas at the same pressure at which foaming agent was added to monomer.

The mold used was an annular cylinder wherein the outer diameter of the mold cavity was about 1½ inches and the inner diameter about 1 inch. A mandrel slides vertically downward until an exit port, or annular opening, exists at the bottom of the mold through which the polymerized contents of the cavity are ejected. The mold cavity was about 8 inches long and the mold was provided with temperature and pressure indicators and a heating jacket to regulate mold temperature.

The pressure in the mold cavity was substantially increased over that pressure at which foaming agent was added to monomer and this pressure in the mold cavity, referred to as initial polymerization pressure, was maintained substantially constant while the mold was being filled with the polymerizable lactam mixture. The lactam mixture added to the mold cavity did not completely fill the cavity and, accordingly, heptane under pressure was immediately added at the top of the mold cavity and remained on top of the lactam mixture due to its lower density. The heptane prevented prenucleation at the outset of polymerization and maintained the volume of the polymerizable mixture substantially constant. The feed ports of the mold cavity were closed and substantial polymerization of the mixture to polycaprolactam occurred within minutes as indicated by a leveling off of the pressure or temperature.

Ejection of the substantially polymerized solid polymer from the mold cavity was effected by opening the exit port of the mold so that the solid polymer entered an area of lower, i.e. atmospheric, pressure. The temperature of this area was 25° C. In order to assist in ejection of the polymer, just prior to opening the exit port, the upper end of the mold cavity was connected to a supply of nitrogen at a pressure equal to the pressure in the mold cavity at initiation of ejection. The polycaprolactam, after ejection from the mold cavity, expanded and foamed in the solid state instantaneously about equally in all directions to a volume between about from 4 to 60 times the volume of the molten lactam and maintained substantially the same shape it had in the mold cavity.

Table I below describes specific conditions, as indicated, under which certain runs were made according to the present process to obtain a closed cell, foamed, expanded polycaprolactam whose cell walls are oriented and wherein the density at the surface of the polycaprolactam is at least about one and a half times the average density of the foamed polycaprolactam. Some significant advantages of foamed polymers having a surface layer of closed cells having a higher density can be seen from the abrasion resistance and hardness data in Table II. The tensile strength of the products of the examples was at least equal to 20 times the density to the power 1.45.

TABLE I

| Example | Foaming agent | Foaming agent added to lactam monomer, pressure, p.s.i. | Initial polymerization pressure in cavity, p.s.i. | Mold cavity temp., °C. | Polymerization time, sec.[1] | Peak pressure during polymerization, p.s.i. | Time in mold, min. (sec.) |
|---|---|---|---|---|---|---|---|
| 1 | Propane | 500 | 1,200 | 180 | 59 | 1,470 | 3 (26) |
| 2 | do | 400 | 1,000 | 180 | 65 | 1,275 | 3 |
| 3 | do | 400 | 1,300 | 180 | 63 | 1,425 | 3 |
| 4 | do | 300 | 1,100 | 180 | 62 | 1,175 | 3 |
| 5 | do | 600 | 1,900 | 170 | 82 | 1,900 | 3 |
| 6 | do | 800 | 1,900 | 170 | 80 | 2,000 | 3 |
| 7 | do | 1,000 | 2,300 | 170 | 84 | 2,675 | 3 |
| 8 | do | 1,000 | 2,300 | 170 | 89 | 2,650 | 3 |
| 9 | Butane | 400 | 1,150 | 170 | 91 | 1,310 | 3 |
| 10 | do | 400 | 1,150 | 170 | 90 | 1,350 | 3 |

[1] Time from beginning of monomer delivery to cavity until pressure levels off at peak pressure.

POSTFORMING

Within about 15 seconds after ejection of the polycaprolactam, the foamed, expanded hollow cylinder is cut along its long axis, flattened, placed in a press at 25° C. and pressure applied for about 3 minutes. The press is then opened and the result is a nearly flat sheet 7/16" to 5/8" thick depending on the volumetric expansion. The surfaces are white with bubbles so small as to be invisible to the naked eye. In order to illustrate that these sheets of foamed, expanded polycaprolactam are extremely resistant to force and abrasion, Shore durometer and abrasion resistance tests were conducted at the surface with the results indicated. To determine average density, the weight of the sheet was divided by the volume. To determine density at the surface a slice 15 mils thick was cut parallel to the surface and included the surface and its density determined in the same manner. It can be seen from the abrasion index test that polycaprolactam made by this process having an average density of 7–8 pounds per cubic foot is about equivalent to a standard solid rubber in abrasion resistance and from the Durometer readings it can be seen that the polycaprolactam surface is very hard.

TABLE II

| Example | Average density, #/cu. ft. | Shore Durometer A[1] | NBS abrasion index[2] | Density at the surface, #/cu. ft. |
|---|---|---|---|---|
| 1 | 6.5 | | | |
| 2 | 7.1 | | | |
| 3 | 8.0 | 80 | 105 | 14 |
| 4 | 8.4 | 75 | 154 | |
| 5 | 11.2 | 93 | 2,780 | 20 |
| 6 | 10.2 | 91 | 758 | |
| 7 | 6.5 | 83 | 88 | 14.0 |
| 8 | 4.8 | 70 | 104 | 7.3 |
| 9 | 7.5 | 75 | 214 | |
| 10 | 5.5 | 68 | 64 | |

[1] Shore Durometer A, ASTM designation: D-1706-61.
[2] National Bureau of Standards Abrasion Index Text, ASTM designation: D-1630-61.

EXAMPLES 11–18

The procedure described in Examples 1 to 10 was followed except, as indicated in Table III, different foaming agents were employed and the foaming agent was incorporated in the combined streams of catalyzed and promoted lactam in the mold cavity which was prepressurized with gaseous foaming agent. The temperature of the catalyzed stream was about 130° C. and the promoted stream about 150° C. The gas pressure in the mold cavity was maintained substantially constant during filling with lactam by venting gaseous foaming agent at the top of the mold. Polymerization was conducted under constant pressure maintained by the addition of nitrogen. After about 3 minutes from time of delivery of monomer to the mold, the polycaprolactam was ejected from the cavity by opening the exit port. Cells were predominantly closed, cell walls were oriented and the density at the surface of the foamed expanded polycaprolactam was at least about one and a half times the average density of the foamed polycaprolactam. The tensile strength was at least equal to 20 times the density to the power 1.45.

open-celled polymer involves a two-stage pressure drop, i.e., a slow pressure drop prior to ejection plus the usual rapid pressure drop that accompanies ejection of the polymer (Examples 24 to 28). Another means of making open-celled articles involves ejecting the polymer from the mold cavity within a very short time after substantial polymerization with or without a pre-ejection pressure drop (Examples 27 to 30).

The procedure described in Examples 11–18 was substantially followed utilizing propane as the foaming agent. The catalyzed and promoted streams, respectively, were heated to 125° C. and 150° C. in Examples 24–26; 140° C. and 180° C. in Examples 27–29; and 160° C. and 200° C. in Example 30. However, in order to obtain open-celled polycaprolactam, pressure was maintained constant

TABLE III

| Example | Foaming agents | Foaming agent added to lactam, pressure, p.s.i. | Polymerization in cavity, pressure, p.s.i. | Foam density, #/cu. ft. | Mold cavity temp., ° C. |
|---|---|---|---|---|---|
| 11 | Propane | 1,000 | 1,750 | 1.3 | 200 |
| 12 | Butane | 400 | 1,000 | 2 | 200 |
| 13 | Pentane | 200 | 1,750 | 3 | 200 |
| 14 | Butane-pentane¹ | 200 | 500 | 2 | 200 |
| 15 | Propylene | 400 | 1,950 | 3.5 | 200 |
| 16 | Cyclopropane | 500 | 1,800 | 3 | 200 |
| 17 | Argon | 2,400 | 2,400 | 15 | 190 |
| 18 | Nitrogen | 1,800 | 1,800 | 20 | 190 |

¹ Butane was added to the mold until the pressure reached 200 p.s.i., then the pressure was raised to 300 by the addition of pentane.

EXAMPLES 19–23

The procedure described in Examples 1–10 above was repeated except that 0.5% by weight disodium N stearyl β-iminodipropionate was substituted for potassium stearate, and lauryl lactam or caprylolactam was substituted for caprolactam in the promoter stream. The promoter stream, heated to about 180°–200° C., contained 0.6 mole percent of the polycarbonate promoter and the catalyzed stream was heated to 120° C. Propane was used as the foaming agent. The tensile strength of the resulting foamed expanded polycaprolactam was at least equal to 20 times the density to the power 1.45.

during polymerization until about 15 seconds before ejection, at which time either pressure was reduced slowly, e.g. five to ten seconds, to the ejection pressure and then ejected, or ejection of the polycaprolactam occurred almost immediately after polymerization was substantially complete and without a pre-ejection pressure drop. The density at the surface of the foamed expanded polycaprolactam is at least about one and a half times the average density of the polycaprolactam. The closed cellular skin integral with the open-celled interior of the polylactam was less than about a quarter inch thick. The tensile strength was at least equal to 20 times the density to the power 1.45.

TABLE V

| Example | Propane foaming agent added to lactam monomer, pressure, p.s.i. | Polymerization pressure in cavity, p.s.i. | Mold cavity temp., ° C. | Time in mold, min. (sec.) | Ejection pressure,¹ p.s.i. | Average density, #/cu. ft. | Density closed cell skin, #/cu. ft. |
|---|---|---|---|---|---|---|---|
| 24 | 700 | 1,900 | 210 | 3 | 500 | 1.3 | 2.5 |
| 25 | 700 | 1,900 | 210 | 3 | 300 | 1.2 | 2.3 |
| 26 | 700 | 1,200 | 210 | 3 | 300 | 1.1 | 2.1 |
| 27 | 850 | 1,800 | 210 | 3 (45) | 500 | 1.1 | |
| 28 | 1,000 | 1,800 | 210 | 3 (45) | 500 | 1.0 | |
| 29 | 1,000 | 1,800 | 210 | 3 (45) | 1,800 | 1.6 | |
| 30 | 400 | 1,525 | 190 | 3 (55) | 1,525 | 3.7 | 8.0 |

¹ Pressure in mold cavity at which time polycaprolactam is ejected.

TABLE IV

| Example | Comonomer | Foaming agent added to lactam monomer, pressure, p.s.i. | Initial polymerization in cavity pressure, p.s.i. | Mold cavity temp., ° C. | Polymerization time, min. (sec.) | Peak pressure during polymerization, p.s.i. | Time in mold, min. (sec.) | Foam, density #/cu. ft. |
|---|---|---|---|---|---|---|---|---|
| 19 | Lauryl lactam | 1,000 | 1,350 | 160 | 1 (45) | 1,700 | 3 | 3 |
| 20 | do | 500 | 800 | 160 | | 800 | 3 | 9.2 |
| 21 | do | 750 | 1,000 | 160 | 1 (20) | 1,320 | 3 | 4.4 |
| 22 | Caprylolactam | 750 | 1,200 | 140 | (47) | 1,680 | 4 | 8.9 |
| 23 | do | 1,000 | 1,500 | 150 | (29) | 2,455 | 2 (30) | 5.0 |

EXAMPLES 24–30

The following examples illustrate methods of making foamed expanded shapes having a skin of closed cells that cover and are integral with open cells that constitute the interior of the structure and postforming the foamed article to a predetermined shape. A method of making an

POSTFORMING

The foamed, expanded polycaprolactam of Example 30 in the form of a hollow cylinder was slit longitudinally, flattened, and placed in a press, heated to 150° C., all within 20 seconds after ejection from the mold cavity. The press consisted of two heated platens to each of which was affixed a strip of steel forming mating dies having the outline of an automobile visor. 500 pounds of force was applied to the platens, and maintained for 3 minutes. The press was opened and the shaped expanded, foamed polycaprolactam was then held flat in a cold press for 3 minutes. The resulting material had the form of a sunvisor ⅞ inch thick wherein the material defining the periphery of the visor was compressed to about ⅛ inch. The sunvisor had a closed celled, high density surface layer or skin that was extremely tough and abrasion resistant and the interior of the sunvisor was composed of open cells.

The polylactam of Example 27 having closed cellular surfaces was skived to remove the closed cellular surfaces. This produced a cellular polylactam with all open cells which had high tensile strength, and was soft and absorbent.

EXAMPLES 31–39

The procedure described in Examples 1 to 10 was repeated using propane as foaming agent. Polycaprolactam having substantially all closed cells was produced in Examples 32–39. Potassium stearate was used only in Example 31 and pressure on the polycaprolactam was bled to about 400 p.s.i. five seconds before ejection and, therefore, the polylactam had a closed cellular skin, about ¼ inch thick, that was integral with open cells that constituted the interior of the foam structure.

TABLE VI

| Example | Promoted lactam stream temperature, °C. | Propane pressure, p.s.i. | Polymerization pressure, p.s.i. | Mold cavity temp., °C. | Time in mold, min. (sec.) |
|---|---|---|---|---|---|
| 31 | 150 | 750 | 1,890 | 193 | 5 (19) |
| 32 | 130 | 1,080 | 1,450 | 180 | 3 |
| 33 | 130 | 1,500 | 2,050 | 185 | 5 |
| 34 | 130 | 1,500 | 2,050 | 190 | 4 |
| 35 | 130 | 1,500 | 2,050 | 182 | 7 (30) |
| 36 | 160 | 600 | 2,600 | 190 | 3 |
| 37 | 160 | 800 | 2,600 | 190 | 3 |
| 38 | 150 | 1,400 | 2,600 | 195 | 5 |
| 39 | 150 | 1,400 | 2,600 | 195 | 7 |

Note.—Catalyzed lactam stream heated to 130° C. in all cases.

TENSILE STRENGTH DETERMINATIONS

The tensile strength was determined on foamed, expanded polycaprolactams of the above examples by the following procedure. To determine tensile strength parallel to the surface and determine center density a ⅛ inch thick slice was removed midway between the surfaces of the foamed, flattened polycaprolactam by making two cuts parallel to the surfaces. From these slices 2 inch long tensile specimens were cut in the shape of a dog bone, being 1 inch wide at the ends and having a 1 inch long, ½ inch wide reduced section in the middle. The density of the specimens was measured. To determine tensile strength and density at the surface additional slices 15 mils thick were cut parallel to the surface and including the surface. The density of the slice was measured. Tensile specimens were cut from these slices as described above. In all cases, the density of the tensile specimens did not vary by more than 25%. Duplicate specimens were preconditioned to 50% relative humidity at 20° C. These specimens were stretched in a tensile testing device, e.g. an Instron tester, at 0.5 inch per minute. Tensile strength was calculated by dividing the breaking load by the minimum cross-sectional area prior to stretching and the results of the duplicate tests were averaged. The results demonstrate that tensile strength increases rapidly with density increase, and being much higher at all densities than would be expected from known properties of nylon foams. The tensile strength of the foamed expanded polycaprolactam together with density is given in the following table for specimens taken from the surface and center of the polycaprolactam. As can be seen from this data the tensile strength was at least equal to 20 times the density to the power 1.45. The density of the polycaprolactam at its surface was at least one and a half times the average density of the foamed polycaprolactam.

TABLE VII

| Ex. | Average density, #/cu. ft. | Center density, #/cu. ft. | Center tensile strength parallel to surface, #/sq. in. | Density at the surface, #/cu. ft. | Tensile strength at the surface, #/sq. in. |
|---|---|---|---|---|---|
| 31 | 2.5 | 1.6 | 102 | | |
| 32 | 3.3 | 2.5 | 184 | | |
| 33 | 4.0 | | | 11.5 | 1,850 |
| 34 | 4.0 | | | 6.7 | 920 |
| 35 | 2.6 | | | 6.15 | 725 |
| 36 | 4.0 | 3.1 | 164 | 12.7 | 1,730 |
| 37 | 5.0 | 3.95 | 229 | 16.9 | 2,170 |
| 38 | 2.5 | 1.95 | 128 | | |
| 39 | | 2.85 | 265 | | |

EXAMPLES 40–47

The procedure and ingredients are the same as described in Examples 1 to 10 except that the foaming agent butane was added to the mixed stream in the mold cavity at 500 p.s.i. and the polymerization pressure is varied, as indicated in the table. It can be seen that polymerization pressure affects the cell size i.e., the higher the polymerization pressure the smaller the cell size. The tensile strength of the polycaprolactam products was at least 20 times the density to the power 1.45.

TABLE VIII

| Example | Polymerization pressure, p.s.i. | Foam density, #/cu. ft. | Largest cell size, microns |
|---|---|---|---|
| 40 | 600 | 1.56 | 2,500 |
| 41 | 800 | 1.93 | 200 |
| 42 | 900 | 2.15 | 125 |
| 43 | 1,000 | 2.41 | 50 |
| 44 | 1,400 | 2.87 | 20 |
| 45 | 1,500 | 2.76 | 25 |
| 46 | 1,600 | 2.73 | 20 |
| 47 | 2,000 | 3.07 | 15 |

In Examples 40 to 43 the polycaprolactam has a dual cell structure wherein cells having diameters of 5 to 20 microns are located within the cell walls of cells having diameters of 50 to 2500 microns. In Examples 44 to 47 the polycaprolactam is composed of substantially all cells having diameters between 5 to 50 microns.

What is claimed is:

1. A plug flow process for making foamed polylactam which comprises adding under pressure to molten lactam containing 6 to 12 carbon atoms in the lactam ring, a chemically stable foaming agent that does not decompose in the system under the conditions of temperature and pressure, and polymerizing said lactam containing lactam-base salt, polymerization promoter and said foaming agent in a mold cavity, conducting the polymerization under pressure at least sufficient to maintain said foaming agent in the resulting polylactam, and after said lactam is substantially completely polymerized reducing pressure on the polylactam mass by opening an exit port and ejecting the expandable solid polylactam containing said foaming agent out of the mold cavity through the exit port into an area of lower pressure where solid-state foaming occurs.

2. A process of claim 1 wherein the polylactam is held in the mold cavity after polymerization for a period of no more than about four times the time required for said polymerization.

3. A process of claim 1 wherein the volume of the polymerizing lactam in the mold cavity is maintained substantially constant during at least about the last half of polymerization.

4. A process of claim 1 wherein the polylactam is rapidly ejected into an area of atmospheric pressure.

5. A process of claim 1 wherein the foamed expanded polylactam is postformed to a predetermined shape by the application of pressure.

6. A process of claim 1 wherein the lactam is caprolactam.

7. A process of claim 1 wherein the lactam is a mixture of caprolactam and caprylolactam.

8. A process of claim 1 wherein the lactam is a mixture of caprolactam and laurolactam.

9. A process of claim 1 wherein polymerization is conducted at temperatures below the melting point of the resulting polylactam.

10. A process of claim 1 wherein foaming agent is added to said molten lactam at pressures of about from 50 to 4500 pounds per square inch.

11. A process of claim 1 wherein the foaming agent is hydrocarbon having 1 to 5 carbon atoms.

12. A process of claim 11 wherein pressure during polymerization is about from 1000 to 3000 pounds per square inch.

13. A process of claim 11 wherein the hydrocarbon is propane.

14. A process of claim 11 wherein the hydrocarbon is butane.

15. A process of claim 11 wherein the hydrocarbon is pentane.

16. A plug flow process for making foamed polylactam which comprises adding chemically stable gaseous foaming agent under pressure to molten caprolactam, polymerizing said caprolactam containing lactam-base salt, polymerization promoter and said foaming agent in a mold cavity, conducting the polymerization under pressure at least sufficient to maintain said foaming agent in the resulting polycaprolactam, and after said lactam is substantially completely polymerized, reducing pressure on the polycaprolactam mass at a temperature below about the melting point of polycaprolactam by opening an exit port and ejecting the shaped expandable solid polycaprolactam containing said foaming agent out of the mold cavity through the exit into an area of part atmospheric pressure where solid-state foaming occurs.

17. A process of claim 16 wherein the volume of the polymerizing caprolactam in the mold cavity is maintained substantially constant during at least about the last half of polymerization.

18. A process of claim 16 wherein sufficient pressure is maintained on the polylactam in the mold cavity to effect rapid ejection of the entire shaped article from said cavity.

19. A process of claim 16 wherein the foaming agent is hydrocarbon having from 1 to 5 carbon atoms.

20. A process of claim 19 wherein foaming agent is added to said molten caprolactam at pressures about from 50 to 1500 pounds per square inch.

21. A process of claim 16 wherein the foaming agent is propane.

22. A process of claim 16 wherein the foaming agent is butane.

23. A process of claim 16 wherein the foaming agent is pentane.

24. A process of claim 16 wherein laurolactam is added to the caprolactam.

25. A process of claim 16 wherein caprylolactam is added to the caprolactam.

26. A process of claim 16 wherein said polylactam is held in the mold cavity after polymerization for a period of no more than about four times the time required for said polymerization.

27. A process of claim 16 wherein foaming agent is added to said molten caprolactam at pressures of about from 50 to 4500 pounds per square inch.

28. A process of claim 27 wherein pressure during polymerization is at least about 100 pounds per square inch more than the pressure used to incorporate foaming agent in said molten caprolactam.

29. A process of claim 28 wherein polymerization is conducted at temperatures below the melting point of the resulting polylactam.

References Cited

UNITED STATES PATENTS

| Number | Date | Name | Classification |
|---|---|---|---|
| 3,093,618 | 6/1963 | Graf et al. | 260—78 L |
| 3,206,418 | 9/1965 | Giberson | 260—78 LX |
| 3,207,713 | 9/1965 | Hyde | 260—78 PX |
| 3,234,152 | 2/1966 | Fuller | 260—78 LUX |
| 3,236,789 | 2/1966 | Fuller | 264—54 UX |
| 3,274,132 | 9/1966 | Giberson | 260—78 LX |
| 3,278,523 | 10/1966 | Biener et al. | 260—78 LX |
| 3,300,422 | 1/1967 | Bayerlein et al. | 260—78 LX |
| 3,454,689 | 7/1969 | Garrison | 264—53 |
| 3,494,999 | 2/1970 | Heckrotte | 260—78 LX |
| 2,268,160 | 12/1941 | Miles | 260—78 |
| 2,379,956 | 7/1945 | Ersepke | 18—14 GX |
| 3,058,162 | 10/1962 | Grabowski | 264—53 |
| 3,140,266 | 7/1964 | Peticolas | 260—2.5 |
| 3,227,664 | 1/1966 | Blades et al. | 260—2.5 |
| 3,227,784 | 1/1966 | Blades et al. | 264—53 |
| 3,290,261 | 12/1966 | Goldblum | 264—54 X |
| 3,417,178 | 12/1968 | Downing et al. | 264—331 |

FOREIGN PATENTS

| Number | Date | Country | Classification |
|---|---|---|---|
| 820,607 | 9/1959 | Great Britain | 260—78 L |
| 1,091,670 | 11/1967 | Great Britain | 260—78 L |
| 918,059 | 2/1963 | Great Britain | 264—54 |
| 933,285 | 8/1963 | Great Britain | 264—54 |
| 1,085,550 | 2/1955 | France | 18—14 G |

OTHER REFERENCES

Rogers, S. S., Edt., "The Vanderbilt Rubber Handbook," ninth edition, New York, R. T. Vanderbilt Co., 1948, pp. 65–67.

Noble, Royce J., "Latex In Industry," second edition, New York, Rubber Age, 1953, pp. 386–387.

Winspear, George G., Edt., "The Vanderbilt Latex Handbook," New York, R. T. Vanderbilt Co., c. 1954, p. 117.

PHILIP E. ANDERSON, Primary Examiner

U.S. Cl. X.R.

18—2 RC, 5 P; 260—2.5 N, 78 L, 78 P; 264—236, 321, 336, DIG 17